(12) United States Patent
Hattori (10) Patent No.: US 6,598,347 B2
(45) Date of Patent: Jul. 29, 2003

(54) WEATHER STRIP (75) Inventor: Tsukasa Hattori, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/842,844

(22) Filed: Apr. 27, 2001

(65) Prior Publication Data

US 2001/0034977 A1 Nov. 1, 2001

(30) Foreign Application Priority Data

Apr. 27, 2000 (JP) ........................................ 2000-128070
Apr. 27, 2000 (JP) ........................................ 2000-128071

(51) Int. Cl.⁷ ................................................ E06B 7/16
(52) U.S. Cl. ...................................................... 49/479.1
(58) Field of Search ............................. 49/475.1, 479.1, 49/498.1, 495.1, 490.1

(56) References Cited

U.S. PATENT DOCUMENTS

| | | | |
|---|---|---|---|
| 4,884,370 A | 12/1989 | Nozaki et al. ................. | 49/479 |
| 4,949,507 A | * 8/1990 | Vaughan ..................... | 49/482.1 |
| 4,977,706 A | 12/1990 | Kisanuki ..................... | 49/479 |
| 5,035,937 A | * 7/1991 | Nozaki ....................... | 49/490.1 |
| 5,258,157 A | 11/1993 | Nozaki et al. ............... | 264/261 |
| 5,269,101 A | * 12/1993 | Nozaki et al. .............. | 49/479.1 |
| 5,551,192 A | * 9/1996 | Avendano et al. .......... | 49/484.1 |
| 5,972,268 A | 10/1999 | Nakajima et al. | |
| 5,976,438 A | 11/1999 | Hamabata ................... | 264/138 |
| 6,007,753 A | 12/1999 | Nagata | |
| 6,395,355 B1 | * 5/2002 | Nakajima et al. .......... | 49/490.1 |

FOREIGN PATENT DOCUMENTS

| | | |
|---|---|---|
| EP | 0 427 383 A2 | 5/1991 |
| GB | 2 329 143 | 3/1999 |
| GB | 2 334 288 | 8/1999 |
| GB | 2 360 058 | 9/2001 |
| JP | 5024055 A | 2/1993 |
| JP | 6305372 A | 11/1994 |

* cited by examiner

Primary Examiner—Jerry Redman
(74) Attorney, Agent, or Firm—Posz & Bethards, PLC (57) ABSTRACT Each corner portion is formed between straight-lined portions so as to connect them. Each of the straight-lined portions has a trim portion having a substantially U-shape in section and a hollow seal portion. The corner portion has a molded trim portion and a molded hollow seal portion. The molded trim portion is formed of a hard material with predetermined hardness and flexibility so as to have a substantially U-shape in section. The molded hollow seal portion is composed of a soft material. The opening width between opposite side walls of the molded trim portion is formed to be narrower than the opening width between opposite side walls of the trim portion. Further an opening portion for drawing out a forming core member is formed at an edge of the molded hollow seal portion. Then, a flap portion is provided for abutting against the outer surface of the molded trim portion. Notch portions for facilitating the elastic deformation of the flap portion are formed in portions of the flap portion.

10 Claims, 6 Drawing Sheets

WEATHER STRIP

CROSS REFERENCE TO RELATED APPLICATIONS

This application is based on Japanese Patent Applications No. 2000-128070 and No. 2000-128071, which are incorporated herein by reference.

BACKGROUND OF THE INVENTION

1. Field of the Invention

The present invention relates to a weather strip attached to, for example, a peripheral portion of a door opening of a vehicle or the like.

2. Description of the Related Art

Generally, such a weather strip of this kind is provided with trim portions each having a substantially U-shape in section, and hollow seal portions each formed on a one-side outer surface of the trim portion. Then, at least one holding lip is formed on the inner side surface of the trim portions so as to project thereon. In the condition that the trim portions have been attached to a peripheral flange of a door opening of a vehicle body, the holding lip is brought into pressure contact with a side surface of the flange and another side surface of the flange is substantially brought into pressure contact with the opposite inner side surface of the trim portions so that the weather strip is held in an attachment state.

Conventionally, in such a weather strip, trim portions and hollow seal portions of straight-lined portions corresponding to the upper and lower sides and the front and rear sides of the door opening, are formed of a soft and elastic material such as EPDM rubber or the like by extrusion molding. Further reinforce inserts are embedded in trim portions. On the other hand, a trim portion and a hollow seal portion of each of four corner portions corresponding to the four corner portions of the door opening are formed by the following two molding methods for example.

That is, according to one of those two methods, of the trim and hollow seal portions each extruded linearly and integrally, only a part of the hollow seal portion is removed by cutting out. Then, in the condition that the trim portion is bent correspondingly to the cut-out portion of the hollow seal portion along to the corner portion, then, a hollow seal portion is formed on a side surface of the bent portion of the trim portion by mold molding to reproduce the hollow seal portion of the cut-out portion.

On the other hand, according to the other method, each of the trim and hollow seal portions extruded linearly and integrally is cut into predetermined length so as to form two extruded portions. The ends of two extruded portions are disposed in a mold so as to have a predetermined positional relationship. Then, mold molding material such as EPDM rubber is injected into a cavity of the mold. Therefore, the trim and hollow seal portions for a corner portion are formed into a curve by mold molding so as to connect the cut end portions of those extruded portions with each other in the curve, respectively.

When such mold molding method is performed, conventionally, the molded hollow seal portion and the molded trim portion are formed of a single material of EPDM solid rubber having a predetermined hardness by injection molding method at one time in consideration of the flexibility of the molded hollow seal portion and the shape retaining property of the molded trim portion as well as the economical efficiency in forming.

SUMMARY OF THE INVENTION

Recently, in serious consideration of the functions of the respective portions, there is proposed a weather strip in which a molded hollow seal portion is formed of a soft and elastic material, such as thermoplastic elastomer for example TPO, or such as a rubber material for example EPDM rubber, having a high flexibility and elasticity while a molded trim portion is formed of a hard material such as PE, PP, or the like, so as to have a substantially U-shape in section and bent shape. Then, the hard material has a predetermined elastic deformability but it is higher in hardness than the soft and elastic material of the molded hollow seal portion to retain its shape.

In such a proposed weather strip, however, since the molded trim portion of each of the corner portions is formed of the hard material as mentioned above and further since the molded trim portion is formed by mold molding, it is difficult to provide a holding lip on the inner side surface of the molded trim portion such as on the inner side surface of an extruded trim portion in each straight-lined portion. This is because the holding lip is to be undercut when the molded trim is molded thus it is impossible to form the holding lip by mold molding. Accordingly, in the case where a peripheral flange of a door opening of a vehicle body is inserted between the opposite side walls of the trim portion in each of the straight-lined portions and each of the corner portions so that the weather strip is attached to the peripheral portion of the door opening, there has been a problem that it is difficult to hold the flange fixedly between the parallel opposite side walls of the molded trim portion of each of the corner portions.

In the case where the thickness of the side walls of the molded trim portion is substantially the same as that of the side walls of the extruded trim portion, the distance between the opposite side walls of the molded trim potion becomes larger than that of the side walls of the extruded trim portion due to a space where the holding lip is to be provided. Therefore the molded trim portion can not hold the flange of the vehicle body. Meanwhile, it has been proposed that the thickness of the side walls of the molded trim portion is set to be so large that the distance between the opposite side walls of the molded trim portion is substantially the same as the thickness of the flange of the vehicle body. In this case, however, another problem is caused that the flange could be unable to be inserted between the opposite side walls of the molded trim portion due to the rigidity of the side walls of the molded trim portion.

On the other hand, in each of the above-mentioned methods for forming the corner portion, a core member is used for molding the molded hollow seal portion. To draw out the core member from the molded hollow seal portion after molding the molded hollow seal portion, an opening portion is provided along one edge of the molded hollow seal portion. In addition, the opening portion is formed to leave a flap portion at the edge of the molded hollow seal portion so that an end surface of the flap portion can abut against a one-side outer surface of the molded trim portion. This is to prevent the molded hollow seal portion of the corner portion from being deformed flatly when the door is brought into pressure contact with the molded hollow seal portion in the condition that the weather strip has been attached to the door opening.

However, since the flap portion is formed in such a proposed weather strip, the flap portion is to be undercut in accordance with the direction in which the core member is straight drawn out. It is therefore difficult to automate the work of drawing out the core member from the molded hollow seal portion of the corner portion. Thus, there has been a problem that it is necessary for a worker to draw out the core member carefully and curvedly by hand while elastically deforming the flap portion to the outside. In addition, there has been a problem that excessive force is apt to be applied to the flap portion to thereby damage the molded hollow seal portion of the corner portion when the core member is drawn out. Thus, there has been a problem that the manufacturing cost of the weather strip is increased.

The present invention is developed in consideration of the foregoing problems. It is an object of the present invention to provide a weather strip in which a peripheral flange of an opening in a vehicle body or the like can be held fixedly between the opposite side walls of a molded trim portion of each corner portion, and the corner portions can be kept stably in an attachment state.

Further, another object of the present invention to provide a weather strip in which a core member can be drawn out easily from a molded hollow seal portion of a corner portion when the molded hollow seal portion is molded, so that the manufacturing cost of the weather strip can be reduced.

In order to achieve the above object, according to the first aspect of the invention, there is provided a weather strip comprising: straight-lined portions each of which has a trim portion having a substantially U-shape in section and a hollow seal portion; and corner portions each of which is formed between the straight-lined portions so as to connect the straight-lined portions, and each of which has a molded trim portion having a substantially U-shape in section and composed of a hard material and a molded hollow seal portion composed of a soft and elastic material; wherein an opening width between opposite side walls of the molded trim portion of the corner portion is formed to be narrower than an opening width between opposite side walls of the trim portion of each of the straight-lined portions.

According to the invention, in the case where a peripheral flange of a door opening of a vehicle or the like is inserted between the opposite side walls of the trim portion in each straight-lined portion and between the opposite side walls of the molded trim portion in each corner portion and the weather strip is attached to the peripheral flange of the door opening, the opening width between the opposite side walls of the molded trim portion in each corner portion is enlarged. Thus, the opposite side walls are brought into pressure contact with the opposite side surfaces of the flange or the like. As a result, even if no holding lip is provided on the inner surfaces of the side walls of the molded trim portion of each corner portion, the flange or the like can be held fixedly between the opposite side walls of the molded trim portion so that the corner portion can be kept stably in an attachment state.

Preferably, a projection is formed on an inner surface of at least one of the opposite side walls of the molded trim portion of the corner portion.

Consequently, the opening width between the opposite side walls of the molded trim portion in each corner portion can be made narrower. Thus, the force with which the flange or the like is held between the opposite side walls can be enhanced further.

Further preferably, the projection is formed on an inner surface of one of the opposite side walls of the molded trim portion of the corner portion correspondingly to a holding lip provided on an inner surface of one of the side walls of the trim portion of each of the straight-lined portions.

Consequently, on the same side as the holding lip provided in the trim portion of each of the straight-lined portions, strong holding force can be given to the flange or the like by the projection of the molded trim portion of each of the corner portions. Thus, the stability in attachment can be enhanced in the corner portions.

Further preferably, the opposite side walls of the molded trim portion of the corner portion are formed so that the opening width between the opposite side walls of the molded trim portion of the corner portion is enlarged by deforming the corner portion from a predetermined curved state to a larger curved state.

Consequently, in the case where the weather strip is attached to a flange of a door opening of a vehicle body, the straight-lined portions are brought into close relationship so as to deform and bend the corner portions on a large scale. That is, the corner portions are deformed so that the curvature thereof is increased (or the curvature radius thereof is reduced). Thus, the opening width between the opposite side walls of the trim portion can be enlarged. As a result, the flange can be inserted easily between the opposite side walls.

Further preferably, the opposite side walls of the molded trim portion of the corner portion are formed so that the opposite side walls are deformed and restored to have a predetermined opening width when the corner portion is restored to the predetermined curved state from the larger curved state.

Consequently, when the flange has been inserted between the opposite side walls of the molded trim portion of each corner portion, the corner portion is brought into a predetermined curved state. Thus, the opening width opening between the opposite side walls of the molded trim portion of each corner portion is reduced so that the opposite side walls of the molded trim portion are brought into pressure contact with the opposite side surfaces of the flange. Accordingly, the molded trim portion of each corner portion is fixedly attached to and held in the corner portion of the flange. It is therefore possible to attach the weather strip to the peripheral portion of the door opening of the vehicle body easily and surely.

In order to achieve the above object, according to the second aspect of the invention, there is provided a weather strip comprising curved corner portions each having a molded trim portion and a molded hollow seal portion, the molded trim portion having a substantially U-shape in section, the molded hollow seal portion being formed on a one-side outer surface of the molded trim portion, the molded hollow seal portion having an opening portion for drawing out a core member for forming the molded hollow seal portion, the opening portion being formed at an end of the molded hollow seal portion so that a flap portion is left correspondingly to the one-side outer surface of the molded trim portion while the end surface of the flap portion is capable of abutting against the one-side outer surface; wherein at least one notch portion is formed in a part of the flap portion so as to facilitate deformation of the flap portion when the core member is straight drawn out.

In this weather strip, when the core member is straight drawn out from the molded hollow seal portion of the corner portion, the flap portion is apt to be elastically deformed in the direction in which the core member is straight drawn out. Accordingly, the core member can be drawn out from the molded hollow seal portion easily without applying excessive force to the flap portion. As a result, the work of molding the molded hollow seal portion of the corner portion can be automated while the molded hollow seal portion of the corner portion can be prevented from being damaged. Thus, the manufacturing cost of the weather strip can be reduced.

Preferably, as the notch portion, a plurality of notch portions are formed.

In this weather strip, when the core member is straight drawn out from the molded hollow seal portion of the corner portion, the flap portion is elastically deformed more easily. Thus, the core member can be straight drawn out more easily.

Further preferably, the notch portion or portions are formed in accordance with the number of core members.

In this weather strip, in the case where there are a plurality of core members, excessive force is appropriately prevented from being applied to the flap portion when the core members are straight drawn out, respectively.

Further preferably, the notch portion is formed in a portion in which the end of the core member abuts against the flap portion for the first time when the core member is straight drawn out, respectively.

In this weather strip, excessive force is more surely prevented from being applied locally to the flap portion when the core members are straight drawn out from the molded hollow seal portion of the corner portion.

Further preferably, the molded hollow seal portion is formed of thermoplastic elastomer.

Particularly, in the case where the molded hollow seal portion of the corner portion is formed of a material of thermoplastic elastomer such as TPO, or the like, which is lower in stretchability than a rubber material, the foregoing operations are performed markedly.

DETAIL DESCRIPTION OF THE PREFERRED EMBODIMENTS

The first embodiment in which the present invention is carried out in a weather strip attached to a door opening of a vehicle will be described below with reference to the drawings.

Figure 1:
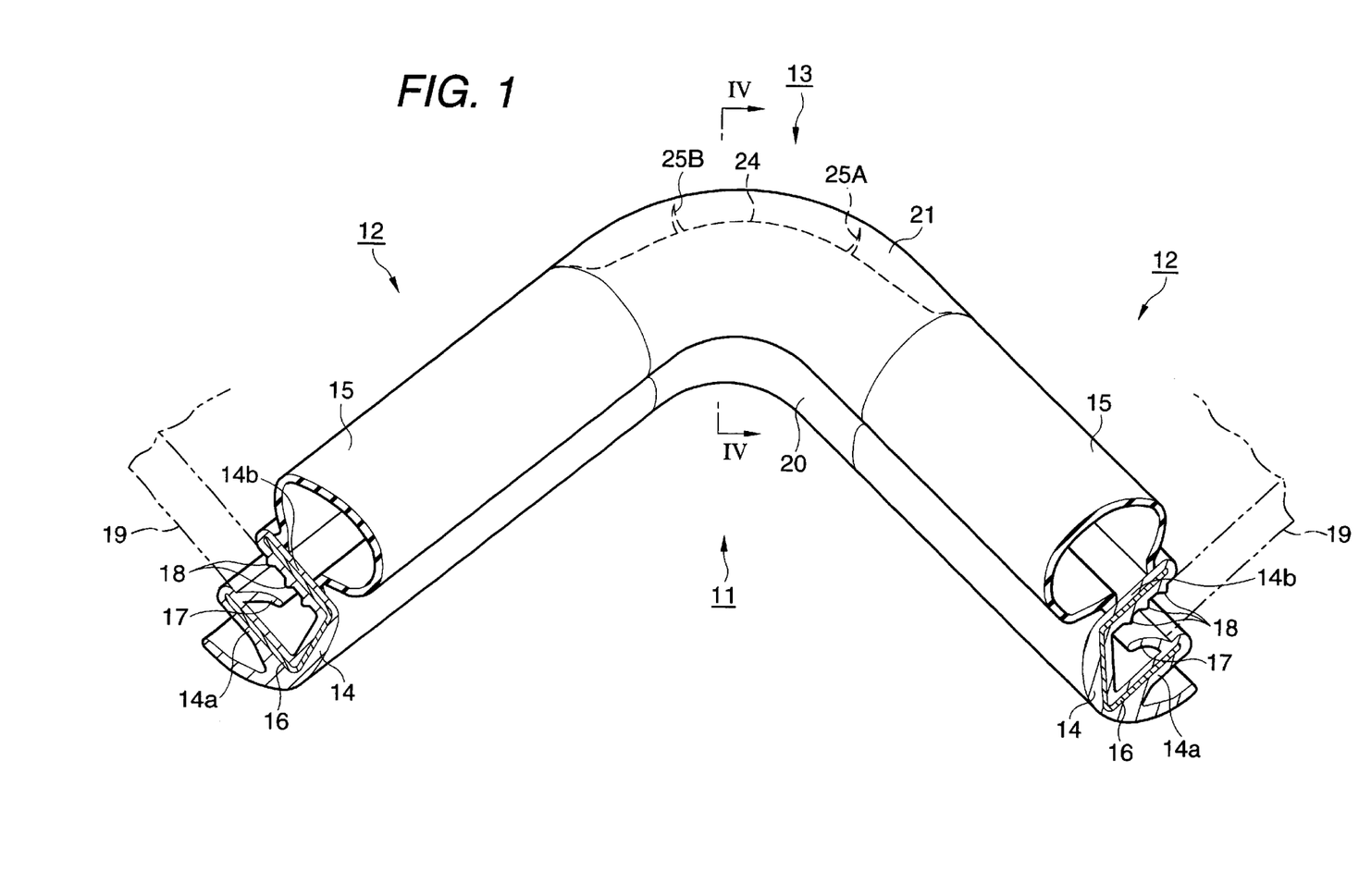
FIG. 1 is a main portion perspective view showing an embodiment of a weather strip of the present invention.
Figure 2:
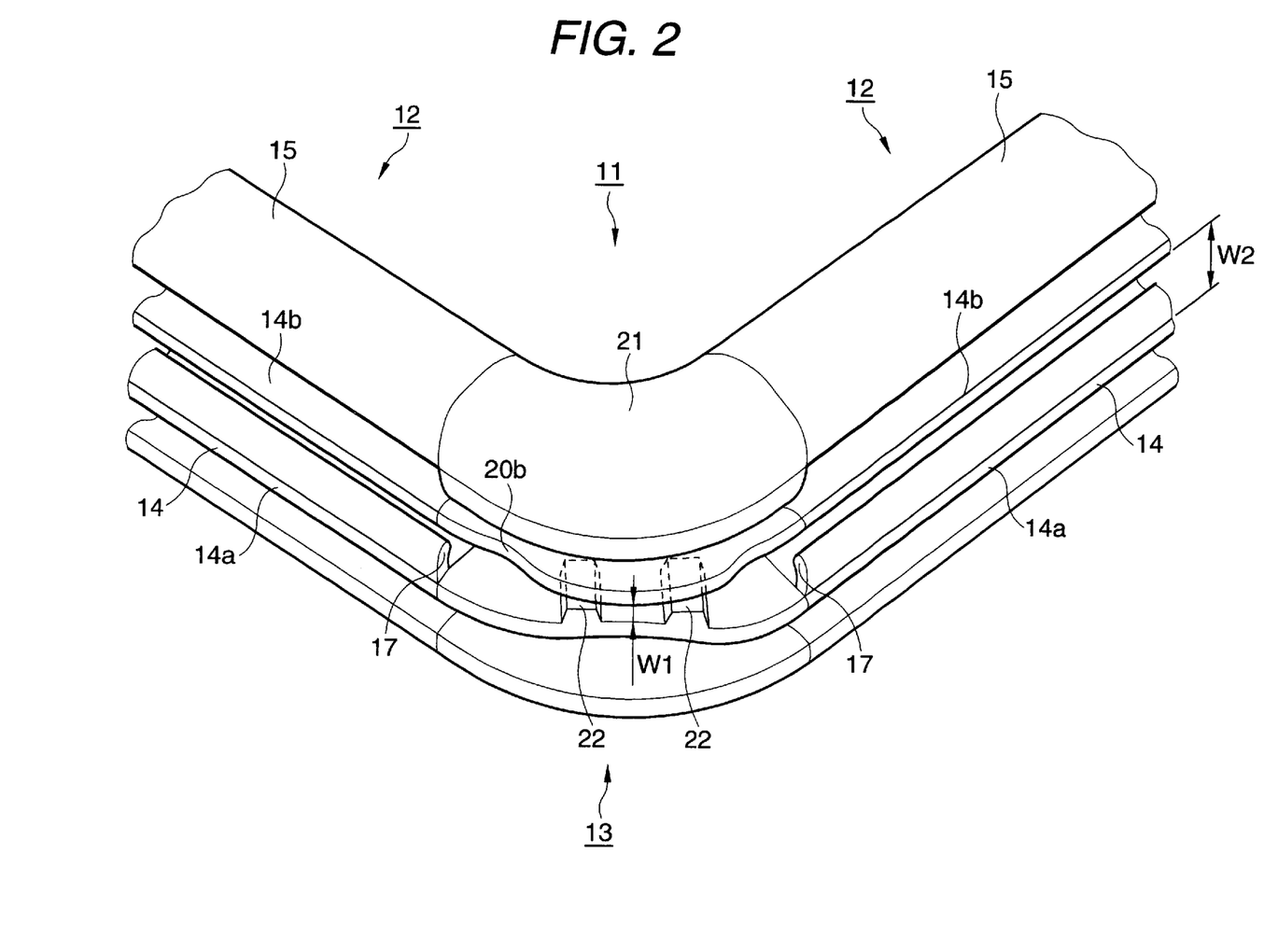
FIG. 2 is a main portion perspective view of the weather strip in FIG. 1, viewed from its upper back.
Figure 3:
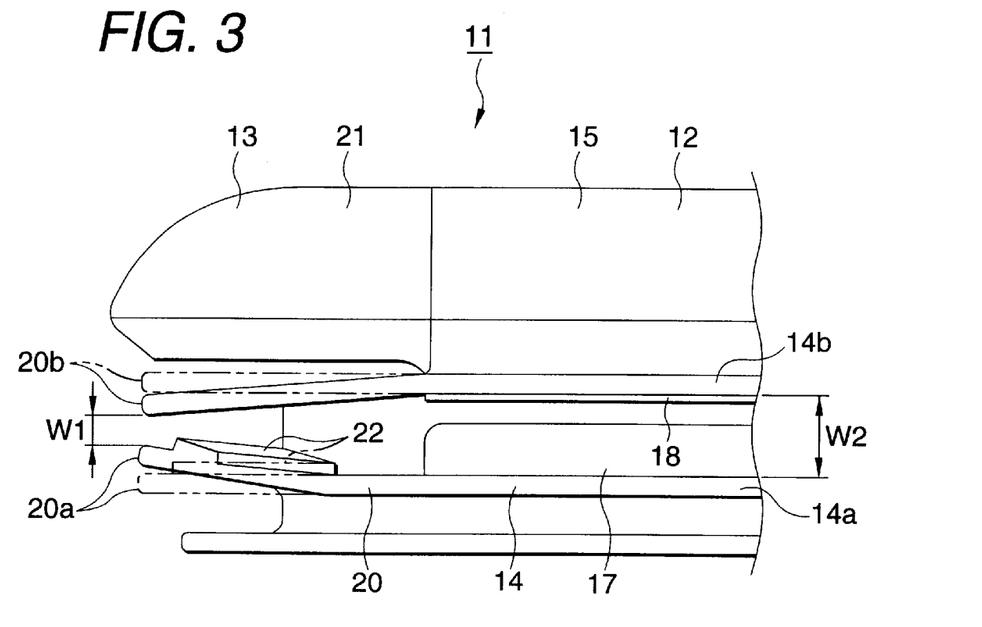
FIG. 3 is a main portion side view of the weather strip in FIG. 1.

As shown in FIGS. 1 to 3, a weather strip 11 in this embodiment has straight-lined portions 12 corresponding to the upper and lower sides and the front and rear sides of a door opening of a vehicle, and corner portions 13 corresponding to the four corner portions of the door opening. Each of the straight-lined portions 12 is constituted by a trim portion 14 having a substantially U-shape in section, and a hollow seal portion 15 formed on a one-side outer surface of the trim portion 14. The trim portion 14 is extruded of a soft and elastic material such as EPDM solid rubber or the like for example, and an insert 16 made of metal is embedded in the trim portion 14. On the other hand, the hollow seal portion 15 is extruded of a softer material such as EPDM sponge rubber or the like.

A holding lip 17 is formed to project on the inner surface of one side wall 14a of the trim portion 14 in each of the straight-lined portions 12 so as to extend in the longitudinal direction of the weather strip 11. A plurality of protrusions 18 are formed on the inner surface of the other side wall 14b of the trim portion 14 so as to extend in the longitudinal direction of the weather strip 11. In the condition that the trim portion 14 has been attached to a peripheral flange 19 of the door opening of the vehicle body, the holding lip 17 and the protrusions 18 are brought into pressure contact with the opposite side surfaces of the flange 19, respectively. Thus, the weather strip 11 is kept in an attachment state.

Each of the corner portions 13 is formed into a curve to connect by injection molding, in a curve, cut end portions of two straight-lined portions 12 formed continuously by extrusion molding, with each other. The corner portion 13 is constituted by a molded trim portion 20 having a substantially U-shape in section, and a molded hollow seal portion 21 formed on a one-side outer surface of the molded trim portion 20. The molded trim portion 20 is molded of a hard material such as PE, PP, or the like, so as to be connected to the cut end portions of the trim portions 14 of the straight-lined portions 12.

Incidentally, the hard material referred to here means a material which is higher in hardness than a soft material composing the trim portions 14 and the hollow seal portions 15 of the straight-lined portions 12. The hard material has flexibility enough to be elastically deformed to follow the movement of the straight-lined portions 12 on the opposite sides of the corner portion 13 when a worker moves the straight-lined portions 12 inward to come close to each other.

The molded hollow seal portion 21 is molded of a soft material, for example, thermoplastic elastomer such as TPO, rubber material such as EPDM solid rubber, EPDM sponge rubber, or the like, so as to be connected to the cut end portions of the hollow seal portions 15 of the straight-lined portions 12.

Figure 4:
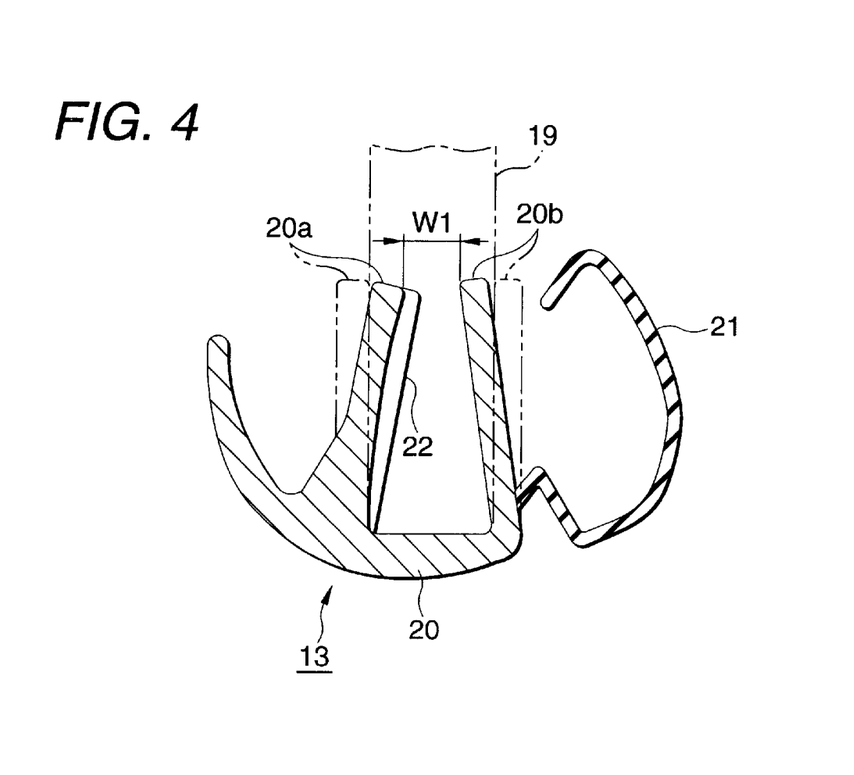
FIG. 4 is an enlarged sectional view taken on line IV—IV in FIG. 1.

As shown in FIGS. 2 to 4, the opening width W1 between opposite side walls 20a and 20b of the molded trim portion 20 in the corner portion 13 is formed to be narrower than the opening width W2 between opposite side walls 14a and 14b of the trim portion 14 in each of the straight-lined portions 12. That is, the opposite side walls 20a and 20b of the molded trim portion 20 in the corner portion 13 are formed not only to be bent to come close to each other as go from the opposite ends of the corner portion 13 toward the center thereof, but also to be inclined to come close to each other as go from the inner bottom portion side of the substantially U-shaped section toward the open end portion side thereof.

A pair of projections 22 are formed on the inner surface of one side wall 20a of the molded trim portion 20 in the corner portion 13 so as to be located on the same side as the holding lip 17 formed on the inner surface of one side wall 14a of the trim portion 14 in each of the straight-lined portions 12. The opening width W1 between the opposite side walls 20a and 20b of the molded trim portion 20 is further narrowed by the projections 22.

Figure 6:
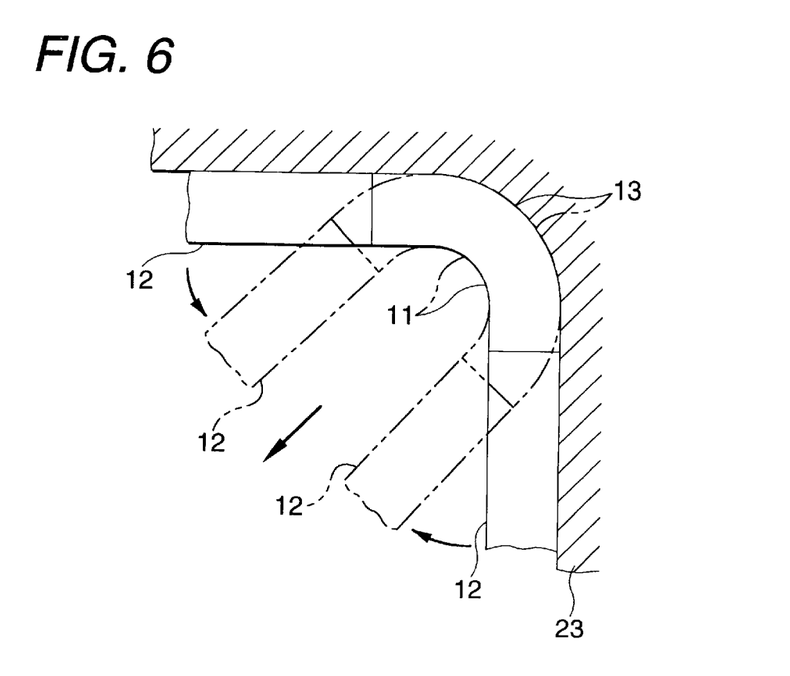
FIG. 6 is an explanatory view showing a method for releasing the corner portions of the weather strip from a forming mold.

Incidentally, when the corner portion 13 of the weather strip 11 is molded, the corner portion 13 is formed into a predetermined curved state as shown by the solid line in FIG. 6. Before the corner portion 13 is entirely cooled and solidified, a forming mold 23 is opened. The corner portion 13 is released from the forming mold 23 in the condition that the corner portion 13 has been deformed to be bent on a larger scale, that is, the corner portion 13 has been deformed so that the curvature of the corner portion 13 is increased (or the curvature radius of the corner portion 13 is reduced), as shown by the two-dot chain line in FIG. 6. The corner portion 13 released from the forming mold 23 is entirely cooled and solidified in the condition that the corner portion 13 has been restored again to the predetermined curved state shown in the solid line in FIG. 6. Incidentally, if the opposite side walls 20a and 20b can be enlarged and thereafter shortened while the corner portion 13 is slightly softened, the corner portion 13 may be deformed in the forming mold 23 without being released therefrom.

Because the corner portion 13 is deformed thus to be bent on a large scale while being softened slightly when it is released, the opposite side walls 20a and 20b of the trim portion 20 in the corner portion 13 are enlarged toward the opposite end portions of the corner portion 13. After that, the corner portion 13 is restored to the predetermined curved state so that the enlarged opposite side walls 20a and 20b are shortened to produce looseness. Thus, the opposite side walls 20a and 20b are deformed to come close to each other. Then, because the corner portion 13 is entirely cooled and solidified as it is, the opposite side walls 20a and 20b are fixed in the condition that they have come close to each other. Here, in this cooling and solidification process, by installing an unillustrated jig for securing the opposite side walls 20a and 20b at a predetermined position, the molded portion having more precise dimensions may be obtained.

Figure 5:
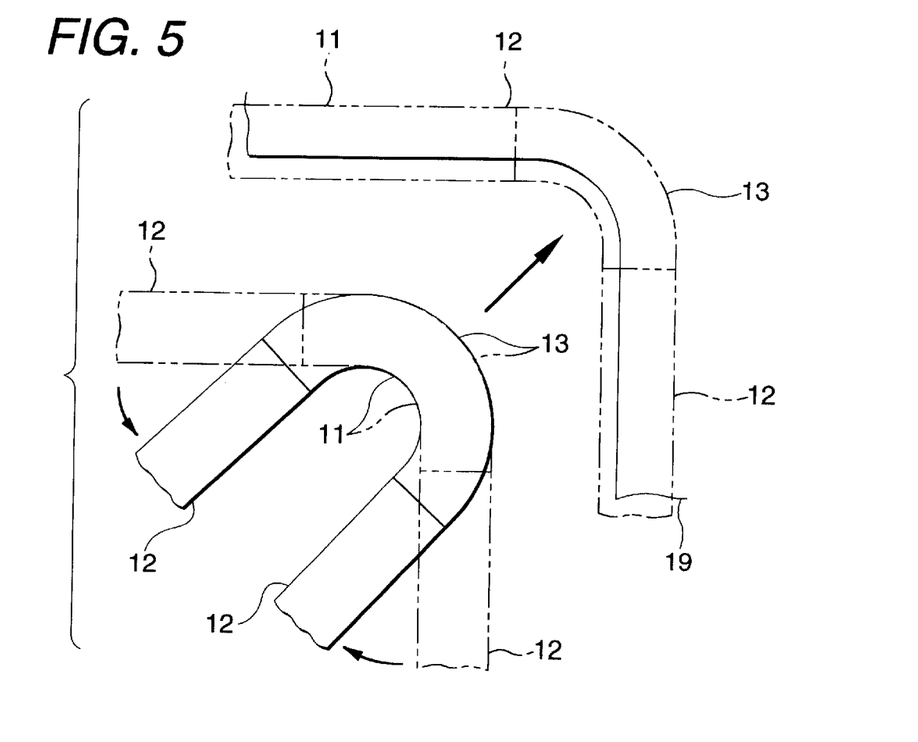
FIG. 5 is an explanatory view showing a method for attaching each corner portion of the weather strip to a flange of a door opening of a vehicle.

Then, when the weather strip 11 configured thus is attached to the peripheral flange 19 of the door opening of the vehicle body, the corner portion 13 is further deformed to be bent further on a large scale as shown by the solid line in FIG. 5. As a result, the opposite side walls 20a and 20b of the molded trim portion 20 are enlarged toward the opposite end portions of the corner portion 13 so as to be elastically deformed to go away from each other as shown by the two-dot line in FIGS. 3 and 4. Thus, the opening width W1 between the opposite side walls 20a and 20b is enlarged so that the flange 19 can be inserted between the opposite side walls 20a and 20b easily.

Then, when the corner portion 13 of the weather strip 11 is restored to the predetermined curved state as shown by the two-dot line in FIG. 5, the opposite side walls 20a and 20b of the molded trim portion 20 in the corner portion 13 are deformed and restored to come close to each other. As a result, the opening width W1 between the opposite side walls 20a and 20b is narrowed so that the opposite side walls 20a and 20b of the molded trim portion 20 are brought into pressure contact with the opposite side surfaces of the flange 19. Thus, the molded trim portion 20 of the corner portion 13 is kept to be attached fixedly to corresponding one of the corner portions of the flange 19.

In addition, when the weather strip 11 is attached to the flange 19, the holding lip 17 provided to project on the inner surface of one side wall 14a of the trim portion 14 is brought into pressure contact with one side surface of the flange 19 in each of the straight-lined portions 12 of the weather strip 11. Thus, the trim portions 14 of the straight-lined portions 12 are kept to be attached fixedly to the straight-lined portions of the flange 19.

Thus, according to this embodiment, the following effects can be obtained.

(1) In this weather strip 11, the molded hollow seal portion 21 composed of a soft material and the molded trim portion 20 composed of a hard material which is higher in hardness than the soft material and which has a predetermined flexibility, are formed in each of the corner portions 13. The weather strip 11 is formed so that the opening width W1 between the opposite side walls 20a and 20b of the molded trim portion 20 in each of the corner portions 13 is narrower than the opening width W2 between the opposite side walls 14a and 14b of the trim portion 14 in each of the straight-lined portions 12 continuously connected to the corner portion 13.

Accordingly, the peripheral flange 19 of the door opening of the vehicle body is inserted between the opposite side walls 14a and 14b of the trim portion 14 in each of the straight-lined portions 12 and between the opposite side walls 20a and 20b of the molded trim portion 20 in each of the corner portions 13 so that the weather strip 11 is attached to the peripheral portion of the door opening. On this occasion, the opening width W1 between the opposite side walls 20a and 20b of the molded trim portion 20 in the corner portion 13 is enlarged. Thus, the opposite side walls 20a and 20b are brought into pressure contact with the opposite side surfaces of the flange 19.

Accordingly, even if no holding lip is provided on the inner surfaces of the side walls 20a and 20b of the molded trim portion 20 of the corner portion 13, the flange 19 can be held fixedly between the opposite sidewalls 20a and 20b of the molded trim portion 20. Thus, the corner portion 13 can be kept stably in an attachment state.

(2) In this weather strip 11, of the opposite side walls 20a and 20b of the molded trim portion 20 in each of the corner portions 13, the projections 22 are formed on the inner surface of one side wall 20a.

As a result, the opening width W1 between the opposite side walls 20a and 20b of the molded trim portion 20 in the corner portion 13 can be made narrower by the projections 22. Accordingly, the force with which the flange 19 is held between the opposite side walls 20a and 20b of the corner portion 13 can be further enhanced.

(3) In this weather strip 11, the projections 22 are formed on the inner surface of one side wall 20a of the molded trim portion 20 in each of the corner portions 13 corresponding to the holding lip 17 provided on the inner surface of one side wall 14a of the trim portion 14 in each of the straight-lined portions 12.

Accordingly, strong holding force can be given to the flange 19 by the projections 22 of the molded trim portion 20 of the corner portion 13, on the same side as the holding lip 17 provided on the trim portion 14 of each of the straight-lined portions 12. Thus, the stability in attachment can be enhanced in the corner portion 13.

(4) In this weather strip 11, when each of the corner portions 13 is deformed to be bent on a large scale, the opposite side walls 20a and 20b of the molded trim portion 20 of the corner portion 13 are elastically deformed to go away from each other. Then, if the corner portion 13 is restored to a predetermined curved state, the opposite side walls 20a and 20b of the molded trim portion 20 in the corner portion 13 are deformed and restored to come close to each other.

Thus, in the case where the weather strip 11 is attached to the peripheral flange 19 of the door opening of the vehicle body, the straight-lined portions 12 are made to come close to each other so as to bend and deform the corner portion 13 on a large scale. Thus, the opening width W1 between the opposite side walls 20a and 20b can be enlarged. Accordingly, the flange 19 can be inserted between the opposite side walls 20a and 20b easily.

When the corner portion 13 is restored to the predetermined curved state after the flange 19 has been inserted thus, the opening width W1 between the opposite side walls 20a and 20b is narrowed so that the opposite side walls 20a and 20b of the molded trim portion 20 are brought into pressure contact with the opposite side surfaces of the flange 19. Thus, the molded trim portion 20 of the corner portion 13 is attached and held fixedly to corresponding one of the corner portions of the flange 19. Accordingly, the weather strip 11 can be attached to the peripheral portion of the door opening of the vehicle body easily and surely.

(5) In the weather strip 11, each of the corner portions 13 is formed in the following manner. That is, the corner portion 13 is formed in the forming mold 23 so as to have a predetermined curved state. Before the corner portion 13 is entirely cooled and solidified, the corner portion 13 is brought into a further largely curved or deformed state. After that, the corner portion 13 is restored to the predetermined curved state again and entirely cooled and solidified.

Thus, the corner portion 13 is restored into the predetermined curved state and entirely cooled and solidified after being curved and deformed on a large scale in a slightly softened state. As a result, the opposite side walls 20a and 20b of the molded trim portion 20 in the corner portion 13 are enlarged toward the opposite end portions of the corner portion 13, and thereafter shortened and fixed in the condition that they have come close to each other. Thus, the opening width W1 between the opposite side walls 20a and 20b of the molded trim portion 20 can be formed to be narrow without giving any special facing work to the surface of the forming mold 23 or the like.

Incidentally, this embodiment may be modified and carried out as follows. Also in such modifications, effects substantially similar to those in the embodiment can be obtained.

In the above-mentioned embodiment, the projections 22 are formed on the inner surface of one side wall 20a of the molded trim portion 20 in each of the corner portions 13 correspondingly to the holding lip 17 formed on the inner surface of one side wall 14a of the trim portion 14 of each of the straight-lined portions 12. Alternatively, the projections 22 may be formed on the inner surface of the other side wall 20b of the molded trim portion 20 in each of the corner portions 13, or on the inner surfaces of the opposite side walls 20a and 20b of the molded trim portion 20.

In the above-mentioned embodiment, the present invention was carried out in the weather strip 11 attached to the peripheral portion of the door opening of the vehicle. Alternatively, the present invention may be carried out in a weather strip to be attached to a peripheral portion of another opening of a vehicle, for example, for a sun roof, a back door, a trunk, a bonnet, or the like.

Since the present invention is configured thus, it has the following effects.

According to the present invention, a peripheral flange of a door opening or the like can be held fixedly between opposite side walls of a molded trim portion in one of corner portions so that each of the corner portions can be kept stably in an attachment state.

Further, by forming a projection on an inner surface of at least one of the opposite side walls of the molded trim portion of the corner portion, in addition to the foregoing effects of the invention, the opening width between the opposite side walls of the molded trim portion in each of the corner portions can be made narrower so that the force with which the flange or the like is held between the opposite side walls of the molded trim portion can be further enhanced.

Furthermore, by forming the projection on an inner surface of one of the opposite side walls of the molded trim portion of the corner portion correspondingly to a holding lip provided on an inner surface of one of the side walls of the trim portion of each of the straight-lined portions, in addition to the foregoing effects of the invention, strong holding force can be given to the flange or the like by projections of the molded trim portion of each of the corner portions, on the same side as a holding lip provided on the trim portion of each of straight-lined portions. Thus, the stability in attachment can be enhanced in the corner portions.

Furthermore, forming the opposite side walls of the molded trim portion of the corner portion so that the opening width between the opposite side walls of the molded trim portion of the corner portion is enlarged by deforming the corner portion from a predetermined curved state to a larger curved state, in addition to the foregoing effects of the invention, the flange can be inserted between the opposite side walls of the molded trim portion in each of the corner portions easily.

Furthermore, by forming the opposite side walls of the molded trim portion of the corner portion so that the opposite side walls are deformed and restored to have a predetermined opening width when the corner portion is restored to the predetermined curved state from the larger curved state, in addition to the foregoing effects of the invention, the weather strip can be attached to the peripheral portion of the door opening of the vehicle body easily and surely.

The second embodiment in which the present invention is carried out in a weather strip to be attached to a door opening of a vehicle will be described below with reference to the drawings.

In this embodiment a weather strip 11 has basically the similar structure to that of the first embodiment as shown in FIG. 1.

Figure 7:
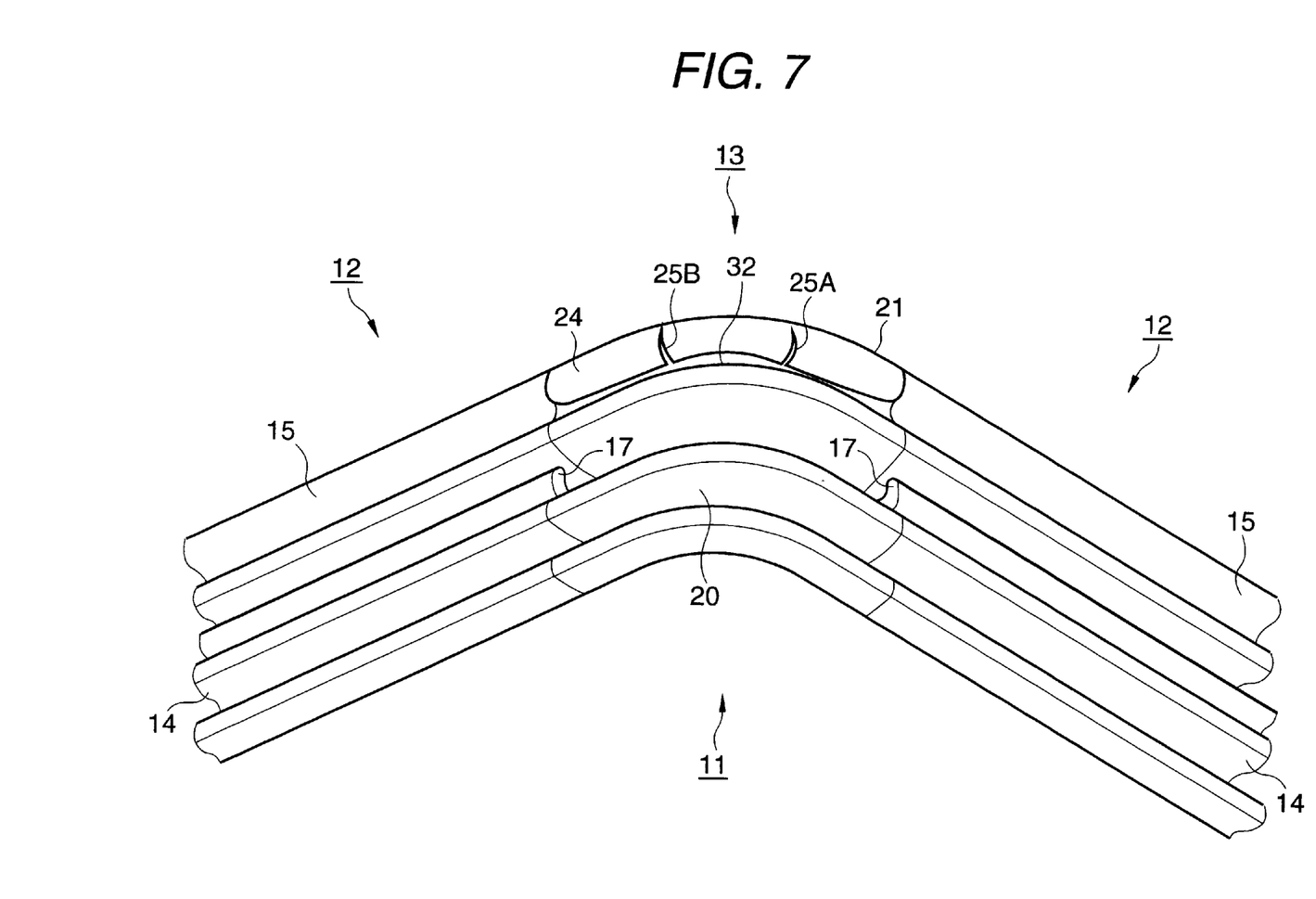
FIG. 7 is a main portion perspective view of the weather strip of FIG. 1, viewed from its lower back.
Figure 8:
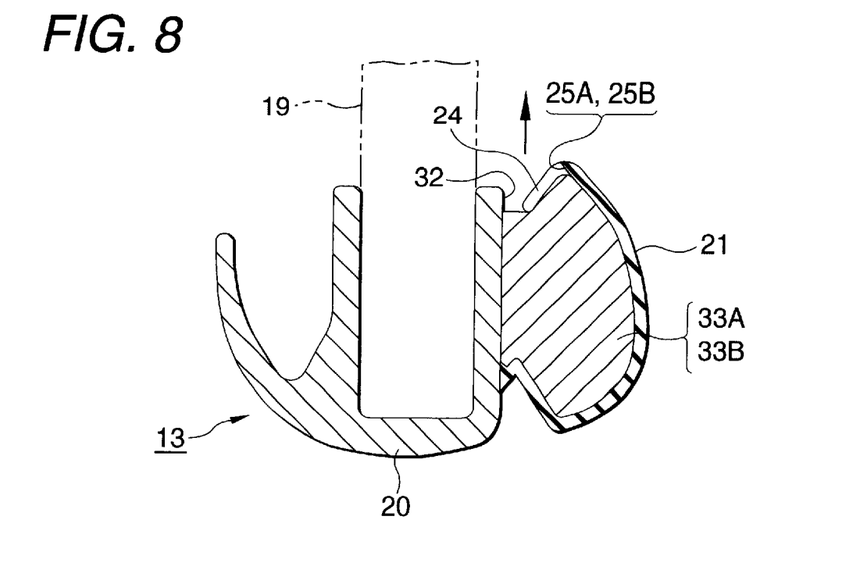
FIG. 8 is an enlarged sectional view taken on line IV—IV in FIG. 1.

As shown in FIGS. 7 and 8, an opening portion 32 is formed at an edge of the molded hollow seal portion 21 in the corner portion 13 so as to extend in the extension direction of the molded hollow seal portion 21. After the molded hollow seal portion 21 has been molded, two forming core members 33A and 33B are straight drawn out from the molded hollow seal portion 21 through the opening portion 32, respectively, in the arrow directions of FIG. 9.

As shown in FIG. 1 and FIGS. 7 to 9, a flap portion 24 which can abut against a one-side outer surface of the trim portion 20 is formed at the edge of the molded hollow seal portion 21 on the opening portion 32 side. In the condition that the weather strip 11 has been attached to the flange 19 of the door opening, when a not-shown door is brought into pressure contact with the hollow seal portions 15 and 21, the end surface of the flap portion 24 abuts against the one-side outer surface of the molded trim portion 20. Thus, the molded hollow seal portion 21 of the corner portion 13 is prevented from being deformed flatly in the portion where the opening portion 32 has been formed.

Figure 9:
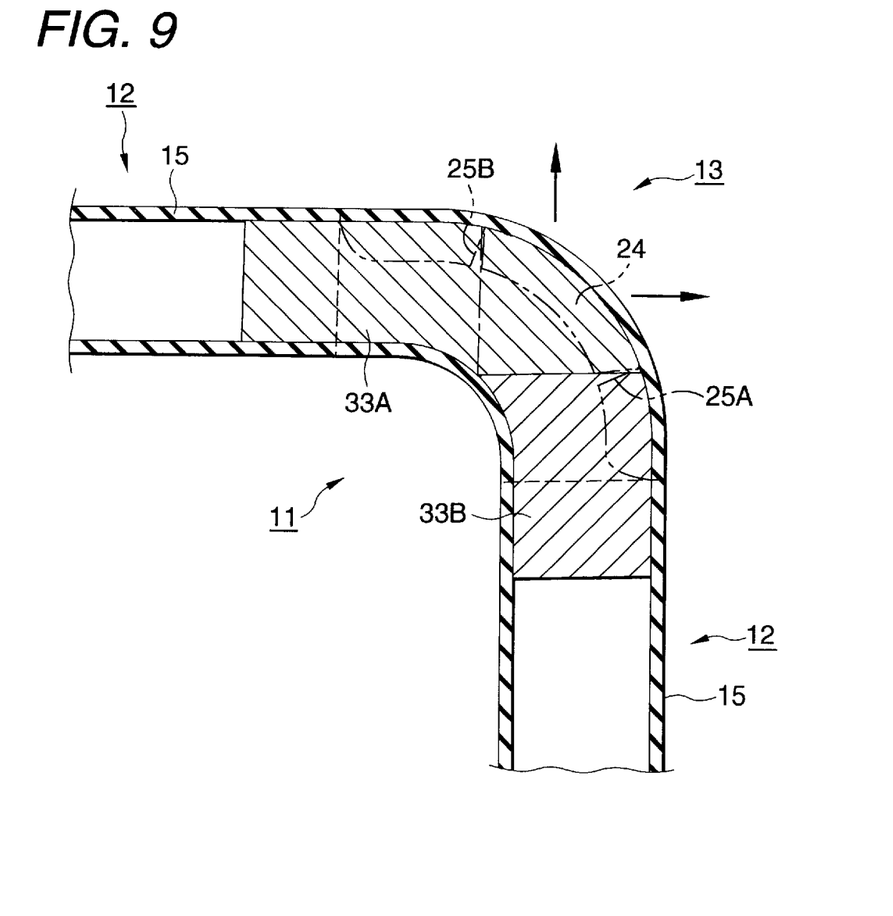
FIG. 9 is a sectional view for explaining a method for forming a corner portion.

In the flap portion 24, two notch portions 25A and 25B each formed substantially linearly are formed to extend in the width direction of the flap portion 24 correspondingly to the two core members 33A and 33B. As shown in FIG. 9, these notch portions 25A and 25B are formed in the portions where the end surfaces of the core members 33A and 33B abut against the flap portion 24 for the first time when the core members 33A and 33B are straight drawn out, respectively. When the core members 33A and 33B are straight drawn out in the arrow directions of FIG. 9, the flap portion 24 is elastically deformed outward in the directions in which the core members 33A and 33B are moved while being divided into a plurality of portions with the notch portions 25A and 25B, respectively. Thus, the core members 33A and 33B can be straight drawn out easily without applying excessive force to the flap portion 24.

Thus, when the molded hollow seal portion 21 of the corner portion 13 in the weather strip 11 is molded, the core members 33A and 33B for forming the inner surface of the molded hollow seal portion 21 can be designed to be drawn out from the molded hollow seal portion 21 by a cylinder or the like while a not-shown movable mold for forming the outer surface of the molded hollow seal portion 21 is released from a fixed mold by a cylinder or the like. Thus, the molding of the corner portion 13 can be performed automatically without worker's hand.

Thus, according to this embodiment, the following effects can be obtained.

(1) In this weather strip 11, the notch portions 25A and 25B are formed in the flap portion 24 at one edge of the molded hollow seal portion 21 in the corner portion 13 so as to facilitate the deformation of the flap portion 24 when the core members 33A and 33B are straight drawn out.

As a result, when the molded hollow seal portion 21 of the corner portion 13 is molded, the flap portion 24 is elastically deformed easily in the directions in which the core members 33A and 33B are straight drawn out. Thus, the core members 33A and 33B can be drawn out from the molded hollow seal portion 21 easily without applying excessive force to the flap portion 24. Accordingly, not only is it possible to automate the work of molding the molded hollow seal portion 21, but also it is possible to prevent the molded hollow seal portion 21 from being damaged. Thus, the manufacturing cost of the weather strip can be reduced.

In addition, if the molded hollow seal portion 21 of the corner portion 13 is formed of a material such as TPO, or the like, which is lower in strechability than a rubber material, the molded hollow seal portion 21 is apt to be damaged. In the weather strip 11 arranged thus, the notch portions 25A and 25B are provided in the flap portion 24 as mentioned above. As a result, the molded hollow seal portion 21 of the corner portion 13 can be more surely prevented from being damaged. Thus, the effect of reduction in manufacturing cost becomes conspicuous in particular.

(2) In this weather strip 11, the two notch portions 25A and 25B are formed in the flap portion 24 in accordance with the number of the core members 33A and 33B. As a result, the flap portion 24 is elastically deformed more easily. Thus, when the two core members 33A and 33B are straight drawn out from the molded hollow seal portion 21 of the corner portion 13, excessive force can be prevented from being applied to the flap portion 24. Accordingly, it is possible to draw out the respective core members 33A and 33B more easily.

(3) In this weather strip 11, the notch portions 25A and 25B of the flap portion 24 are formed in the portions where the core members 33A and 33B abut against the flap portion 24 for the first time when the core members 33A and 33B are straight drawn out, respectively. Accordingly, when the core members 33A and 33B are straight drawn out from the molded hollow seal portion 21 of the corner portion 13, excessive force can be more surely prevented from being applied locally to the flap portion 24. Thus, the fear of damaging the molded hollow seal portion 21 of the corner portion 13 can be suppressed more surely.

Incidentally, this embodiment maybe modified and carried out as follows. Also in such modifications, effects substantially similar to those in the embodiment can be obtained.

Although the two notch portions 25A and 25B are formed in the flap portion 24 in the above-mentioned embodiment, one notch portion may be formed at the center of the corner portion 13 in the flap portion 24, or three or more notch portions may be formed in the flap portion 24.

Although each of the notch portions 25A and 25B is formed substantially linearly on the flap portion 24, each of the notch portions 25A and 25B may be formed like a groove with a certain width.

In the above-mentioned embodiment, in the condition that the straight-lined portions 12 formed continuously by extrusion molding have been cut off, the molded trim portion 20 and the molded hollow seal portion 21 of the corner portion 13 are molded into a curve to connect by injection molding, in a curve, the cut end portions of the straight-lined portions 12 with each other. Otherwise, the hollow seal portion 15 of the extruded straight-lined portion 12 may be cut off partially. In this case, the trim portion 14 is bent correspondingly to the cut-off portion so as to form the molded trim portion 20 of the corner portion 13. After that, the molded hollow seal portion 21 of the corner portion 13 is molded on a side surface of the trim portion 14.

Since the present embodiment is configured thus, it has the following effects.

According to this embodiment of the invention, when the molded hollow seal portion of a corner portion is molded, a core member can be straight drawn out from the molded hollow seal portion easily. Thus, the manufacturing cost of the weather strip can be reduced.

Further, by forming a plurality of notch portions as the notch portion, in addition to the foregoing effect of the invention, a flap portion is elastically deformed more easily when the core member is straight drawn out from the molded hollow seal portion of the corner portion. Thus, the core member can be straight drawn out more easily.

Furthermore, by forming the notches in accordance with the number of the core members, in addition to the foregoing effects of the invention, in the case where there are a plurality of core members, excessive force can be appropriately prevented from being applied to the flap portion when the core members are straight drawn out.

Furthermore, by forming the notch portion in a portion in which the end surface of the core member abuts against the flap portion for the first time when the core member is straight drawn out, in addition to the foregoing effects of the invention, excessive force can be more surely prevented from being applied locally to the flap portion when the core members are straight drawn out from the molded hollow seal portion of the corner portion.

Furthermore, in the case where the molded hollow seal portion of the corner portion is formed of a material of thermoplastic elastomer such as TPO, or the like, which is lower in strechability than a rubber material, the foregoing effects of the invention are exhibited markedly.

What is claimed is:

1. A weather strip, comprising:
   straight portions each of which has a trim portion having a substantially U-shape in section and having an opposite side wall with substantially uniform thickness and a hollow seal portion; and
   a corner portion formed between said straight portions that connects said straight portions by injection molding, said corner portion provided with a molded trim portion having a substantially U-shape in section and composed of a hard material and a molded hollow seal portion composed of a soft material, the molded trim portion of the corner portion having an opposite side wall with a thickness substantially equal to the thickness of the side walls of the trim portions of the straight portion;

wherein an opening width between opposite side walls of said molded trim portion of said corner portion is formed to be narrower than an opening width between opposite side walls of said trim portion in said straight portions.

2. A weather strip according to claim 1 further comprising, a projection formed on an inner surface of at least one of said opposite side walls of said molded trim portion in said corner portion.

3. A weather strip according to claim 2, wherein said projection is formed on an inner surface of one of said opposite if side walls of said molded trim portion in said corner portion correspondingly a holding lip provided on an inner surface of one of said opposite side walls of said trim portion in said straight portions.

4. A weather strip according to claim 1, wherein said opposite side walls of said molded trim portion in said corner portion are formed so that said opening width between said opposite side walls of said molded trim portion in said corner portion is enlarged by deforming said corner portion from a predetermined curved state to a larger curved state.

5. A weather strip according to claim 4, wherein said opposite side walls of said molded trim portion in said corner portion are formed so as to be deformed and restored having a predetermined opening width therebetween when said corner portion is deformed and restored to said predetermined curved state from said larger curved state.

6. A weather strip, comprising:

straight portions each of which has a trim portion having a substantially U-shape in section and a hollow seal portion;

a corner portion provided with a molded trim portion having a substantially U-shape in section and a molded hollow seal portion formed on one side of an outer surface of said molded trim portion, said molded hollow seal portion having an opening portion formed at an end thereof for drawing out at least one forming core member and a flap portion formed to abut against an outer surface of said molded trim portion; and at least one notch portion formed in a part of said flap portion to facilitate deformation of said flap portion.

7. A weather strip according to claim 6, wherein a plurality of notch portions are formed in said part of said flap portion.

8. A weather strip according to claim 6, wherein a number of said notch portions corresponds with a number of said forming core members.

9. A weather strip according to claim 6, wherein said notch portion is formed in a portion in which an end surface of said core member abuts against said flap portion a first time said core member is drawn out.

10. A weather strip according to claims 6, wherein said molded hollow seal portion is formed of thermoplastic elastomer.

* * * * *